United States Patent
Hundling et al.

(10) Patent No.: US 11,853,980 B2
(45) Date of Patent: Dec. 26, 2023

(54) SYSTEM AND METHOD FOR IMPLEMENTING TRANSACTION PROCESSING ECOSYSTEMS

(71) Applicant: JPMorgan Chase Bank, N.A., New York, NY (US)

(72) Inventors: Chris Hundling, St. Petersburg, FL (US); Stephen Saponara, Ringoes, NJ (US); Matthew Winn, Glasgow (GB); Scott Wilson, Glasgow (GB); Anne K. Teixeira, Tampa, FL (US); Rohit Singh Chauhan, London (GB); Clayton Schnelker, Valrico, FL (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 258 days.

(21) Appl. No.: 16/571,779

(22) Filed: Sep. 16, 2019

(65) Prior Publication Data

US 2020/0090144 A1    Mar. 19, 2020

Related U.S. Application Data

(60) Provisional application No. 62/731,396, filed on Sep. 14, 2018.

(51) Int. Cl.
*G06Q 20/08* (2012.01)
*G06F 9/46* (2006.01)
(Continued)

(52) U.S. Cl.
CPC ............. *G06Q 20/085* (2013.01); *G06F 5/00* (2013.01); *G06F 9/466* (2013.01); *G06F 16/258* (2019.01);
(Continued)

(58) Field of Classification Search
CPC ............................ G06F 5/00; G06F 2205/003
See application file for complete search history.

(56) References Cited

U.S. PATENT DOCUMENTS

| 7,725,351 B1 | 5/2010 | Williams |
| 7,783,549 B1 | 8/2010 | Benson et al. |
(Continued)

FOREIGN PATENT DOCUMENTS

| CN | 101420311 | 4/2009 |
| JP | H11-161530 | 6/1999 |
| JP | 2020-507840 | 3/2020 |

OTHER PUBLICATIONS

Wikipedia, "ISO 8583", dated Feb. 10, 2017, "Wikipedia", downloaded from the Internet, URL: http://web.archive.org/web/20170210060152/https://en.wikipedia.org/wiki/ISO_8583, pp. 1-14. (Year: 2017).*

(Continued)

*Primary Examiner* — Pierre M Vital
*Assistant Examiner* — Vy H Ho
(74) *Attorney, Agent, or Firm* — GREENBLUM & BERSTEIN, P.L.C.

(57) ABSTRACT

An embodiment of the present invention is directed to financial transaction ecosystems. A transaction processing ecosystem comprises: a plurality of data sources; a capture interface; and a financial transaction processing system comprising a message bus and a plurality of processors interfacing with the message bus and configured to perform: receiving, via the capture interface, raw data for a payment transaction, wherein the raw data comprises client instructions; normalizing, via the capture interface, the raw data into a normalized transaction format based on a standard data model; publishing, via the capture interface, the normalized transaction format to a message bus; processing, via (Continued)

a first processor of the plurality of processors, the normalized transaction format; and completing the transaction.

17 Claims, 8 Drawing Sheets

(51) Int. Cl.
    *G06F 16/25*     (2019.01)
    *G06F 5/00*     (2006.01)
    *G06Q 20/04*     (2012.01)

(52) U.S. Cl.
    CPC ..... *G06Q 20/042* (2013.01); *G06F 2205/003* (2013.01)

(56) References Cited

U.S. PATENT DOCUMENTS

| | | |
|---|---|---|
| 9,529,863 B1 | 12/2016 | Gindin et al. |
| 9,747,460 B1 | 8/2017 | Kursun |
| 10,445,683 B1 * | 10/2019 | Hession ............ G06F 16/2228 |
| 11,042,863 B1 * | 6/2021 | Omojola ................ G06Q 20/40 |
| 2001/0034677 A1 | 10/2001 | Farhat et al. |
| 2003/0163507 A1 * | 8/2003 | Chang .................. G06F 9/5038 718/100 |
| 2011/0087593 A1 * | 4/2011 | Rigby .................. G06Q 20/40 705/44 |
| 2016/0180319 A1 * | 6/2016 | Klingen ............... G06Q 20/027 705/44 |
| 2018/0240087 A1 * | 8/2018 | Haraguchi ........... G06Q 20/208 |
| 2018/0247296 A1 * | 8/2018 | Win ..................... G06Q 20/385 |
| 2019/0180275 A1 * | 6/2019 | Safak ................... G06Q 20/385 |
| 2019/0244156 A1 * | 8/2019 | Hauser ............ G06Q 10/06312 |
| 2019/0342412 A1 * | 11/2019 | Ruiz-Meraz ............ G06F 9/541 |

OTHER PUBLICATIONS

Notification of Transmittal of the International Search Report and The Written Opinion of the International Searching Authority issued in PCT/US2019/051236 dated Nov. 15, 2019.

W3C Editor. "Web Payments: Capabilities 1.0." In: W3C. May 30, 2017 (May 30, 2017) Retrieved on Oct. 28, 2019 (Oct. 28, 2019) from <https://w3c.github.io/webpayments-ig/latest/capabilities/index.html> entire document.

Extended European search report dated May 3, 2022 issued in European patent application No. 19860168.4-1218.

Chinese Office Action dated Sep. 22, 2023 issued in Chinese Patent Application No. 201980073964.X along with corresponding English machine translation.

Japanese Office Action dated Aug. 29, 2023, issued in Japanese Patent Application No. 2021-513964, along with corresponding English translation.

Basic Knowledge of the fourth bus issued in Computer Course Advanced Edition, 4th (URL:https://jp.fujitsu.com/family/familyroom/syuppan/family/webs/serial/comp2/pdf/comp04.pdf).

* cited by examiner

SYSTEM AND METHOD FOR IMPLEMENTING TRANSACTION PROCESSING ECOSYSTEMS

CROSS REFERENCE TO RELATED APPLICATIONS

The application claims priority to U.S. Provisional Application 62/731,396, filed Sep. 14, 2018, the contents of which are incorporated herein in its entirety.

FIELD OF THE INVENTION

The present disclosure generally relates to a transaction processing ecosystem based on an event driven architecture.

BACKGROUND OF THE INVENTION

Currently, financial institutions use thousands of systems to process transactions. However, many systems perform redundant features and often duplicate high-level functionality many times over. These systems do not provide a full set of end-to-end technical and business functionality leveraging standard accounting practices or providing consistency from a data perspective.

For example, FIG. 1, which depicts a block diagram of a conventional cash management platform for a financial institution, includes a number redundant system components, such as entitlement verification, booking, archiving, etc. With such conventional systems, product offering is not unified nor in real-time and reporting is inconsistent and centered on products, not clients.

SUMMARY OF THE INVENTION

According to one embodiment, the invention relates to a transaction processing ecosystem that comprises: a plurality of data sources; a capture interface; and a financial transaction processing system comprising a message bus and a plurality of processors interfacing with the message bus and configured to perform: receiving, via the capture interface, raw data for a payment transaction, wherein the raw data comprises client instructions; normalizing, via the capture interface, the raw data into a normalized transaction format based on a standard data model; publishing, via the capture interface, the normalized transaction format to a message bus; processing, via a first processor of the plurality of processors, the normalized transaction format; and completing the transaction.

According to one embodiment, the invention relates to a method for processing transactions in a transaction processing ecosystem comprising a financial transaction processing system comprising a message bus and a plurality of processors interfacing with the message bus. The method comprises the steps of: receiving, via a capture interface, raw data for a payment transaction, wherein the raw data comprises client instructions; normalizing, via the capture interface, the raw data into a normalized transaction format based on a standard data model; publishing, via the capture interface, the normalized transaction format to a message bus; processing, via a first processor of the plurality of processors, the normalized transaction format; and completing the transaction.

The computer implemented system and method described herein provide unique advantages to entities, organizations and other users, according to various embodiments of the invention. An embodiment of the present invention is directed to financial transaction processing system that provides a full stack end-to-end transaction processing where various functions are tied together through an event driven architecture. An embodiment of the present invention consolidates various processing components into a single platform through an integrated functional-based architecture based on standardized data models. An embodiment of the present invention achieves efficiencies by eliminating duplicate functions and features throughout isolated systems that process financial transactions. The innovative system and method provide reusability capabilities, maximizes scalability (to address volume constraints), improved stability (globally consistent platform), near real-time data, improved regulatory controls and reporting (via booking principles), resource efficiencies and substantial cost savings. These and other advantages will be described more fully in the following detailed description.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the invention.

DETAILED DESCRIPTION OF PREFERRED EMBODIMENTS

The following description is intended to convey an understanding of the present invention by providing specific embodiments and details. It is understood, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

The disclosure of U.S. Provisional Patent Application Ser. No. 62/677,882, filed May 30, 2018, is hereby incorporated by reference in its entirety.

An embodiment of the present invention is directed to financial transaction ecosystems. According to an embodiment of the present invention, a financial transaction ecosystem may be based on standard accounting principles and may provide end-to-end transaction processing that may include many functions, such as data capture, transaction booking, asset movement, asset journals/holdings, etc.

These functions may be tied together through an event-driven architecture that may be based on one or more standard data models.

Figure 1:
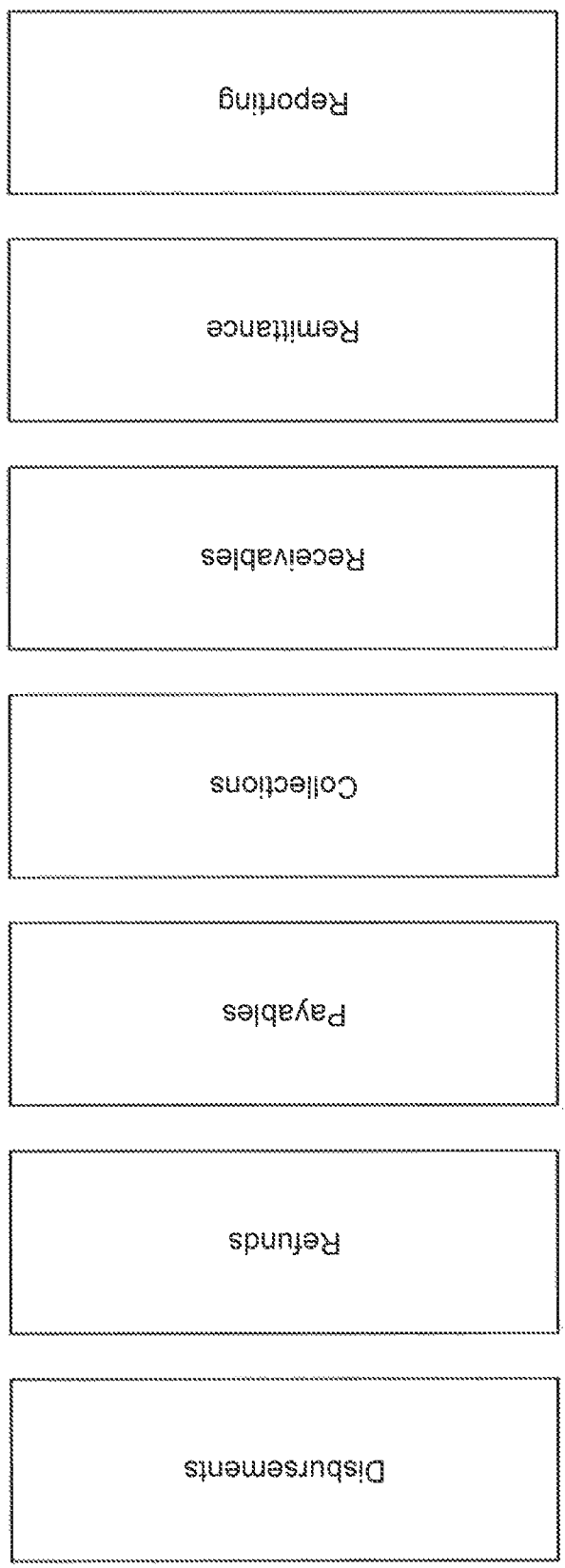
FIG. 1 depicts a conventional cash management platform landscape.
Figure 2:
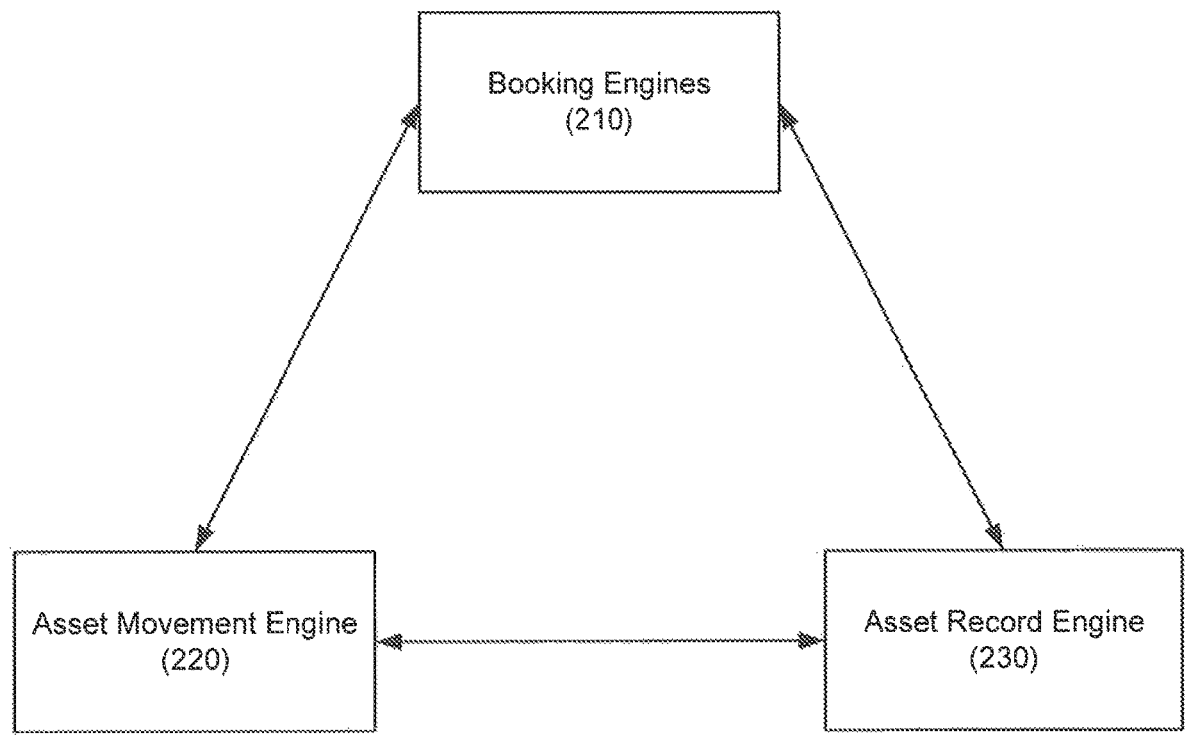
FIG. 2 depicts a financial transaction ecosystem, according to an embodiment of the present invention.

FIG. 2 depicts a financial transaction ecosystem, according to an embodiment of the present invention. As shown in FIG. 2, booking engines 210, asset movement engine 220, and asset record engine 230 may communicate with each other. An exemplary illustration may include a plurality of booking engines, a single asset movement engine and a single asset record engine. Other variations may be realized.

For example, booking engines 210 may book transactions, realignments, foreign exchanges, etc. These events may trigger the setup and/or creation of pending journals and positions.

Asset movement engine 220 may generate and/or monitor events that trigger the takedown/movement of the pending positions to settled and/or confirmed positions.

Asset record engine 230 may create and/or produce journals and holdings.

By ensuring integrity and following standard principles, the core data may be accurate, timely and linked. Accordingly, an embodiment of the present invention provides scalability, significantly reduced reconciliation breaks and a full event based architecture.

Figure 3:
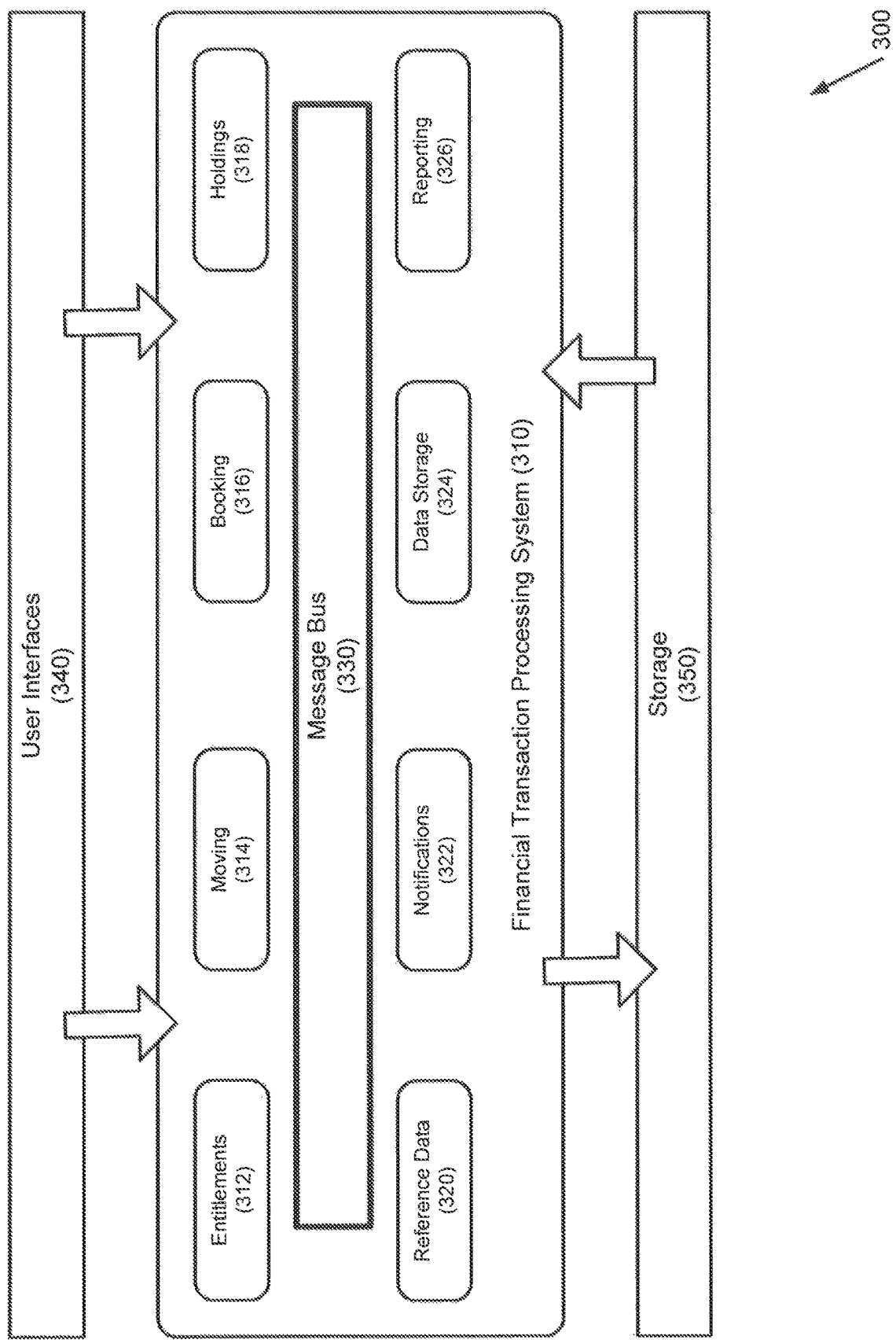
FIG. 3 depicts an exemplary cash management system including a transaction processing system, according to an embodiment of the present invention.

FIG. 3 depicts an exemplary block diagram of a financial transaction ecosystem, according to an embodiment of the present invention. Ecosystem 300 may include financial transaction processing system 310, which may further include a number of processing components that may be used to conduct, record and/or otherwise be involved in a transaction. For example, financial transaction processing system 310 may include entitlements module 312, moving module 314, booking module 316, holdings module 318, reference data 320, notifications module 322, data storage module 324, and reporting module 326. The inclusion of these modules is exemplary only; it should be recognized that fewer, different, or additional modules may be provided as is necessary and/or desired.

According to an embodiment of the present invention, one or more of the modules (e.g., 312, 314, 316, 318, 320, 322, 324, 326, etc.) may relate to a plurality of transaction types that may be undertaken by ecosystem 300. Thus, not all modules may be involved in all transactions. For example, if a transaction does not require a module, the module may remain idle while monitoring message bus 330. In the context of the various embodiments of the present invention, modules may represent processors, processing components, software implementation on hardware components and/or other implementations.

System 300 may consolidate several modules into a single platform, thereby moving from the conventional vertical silos to an integrated functional-based architecture. Technical advantages may include, for example, technical and operations cost reductions by leveraging common components and code base; consolidated product offerings (e.g., integrated receivables, integrated payables, etc.); a modern, event-based architecture with standardized data model; the use of real-time, or near real-time data; tighter regulatory controls and reporting (via booking principals); and improved stability and scalability.

Each module (e.g., 312, 314, 316, 318, 320, 322, 324, 326, etc.) may communicate with message bus 330. For example, an event may be written to message bus 330, and each module may monitor message bus for an action to take. Once the action is taken, another module may take action.

According to an embodiment of the present invention, the modules (e.g., 312, 314, 316, 318, 320, 322, 324, 326, etc.) may be independent (e.g., other than dependencies, they operate independently of each other), and may leverage standard data modules to interface with message bus 230. Each module (e.g., 312, 314, 316, 318, 320, 322, 324, 326, etc.) may have its own datastore and memory and perform various processing.

According to an embodiment of the present invention, user interfaces 340 may allow a user to interact with financial transaction processing system 310. Exemplary user interfaces 340 may include, for example, an external client sending a payments file; an external client uploading invoices; an internal or external system sending transactions for securities processing.

According to an embodiment of the present invention, storage 350 may be provided. Storage 350 may include, for example cache storage (e.g., Gemfire, Hazelcast, etc.), in-memory datastore, persistent storage with cache, etc. For example, system 300 may persist every transaction on the bus to a long term datastore.

Figure 4:
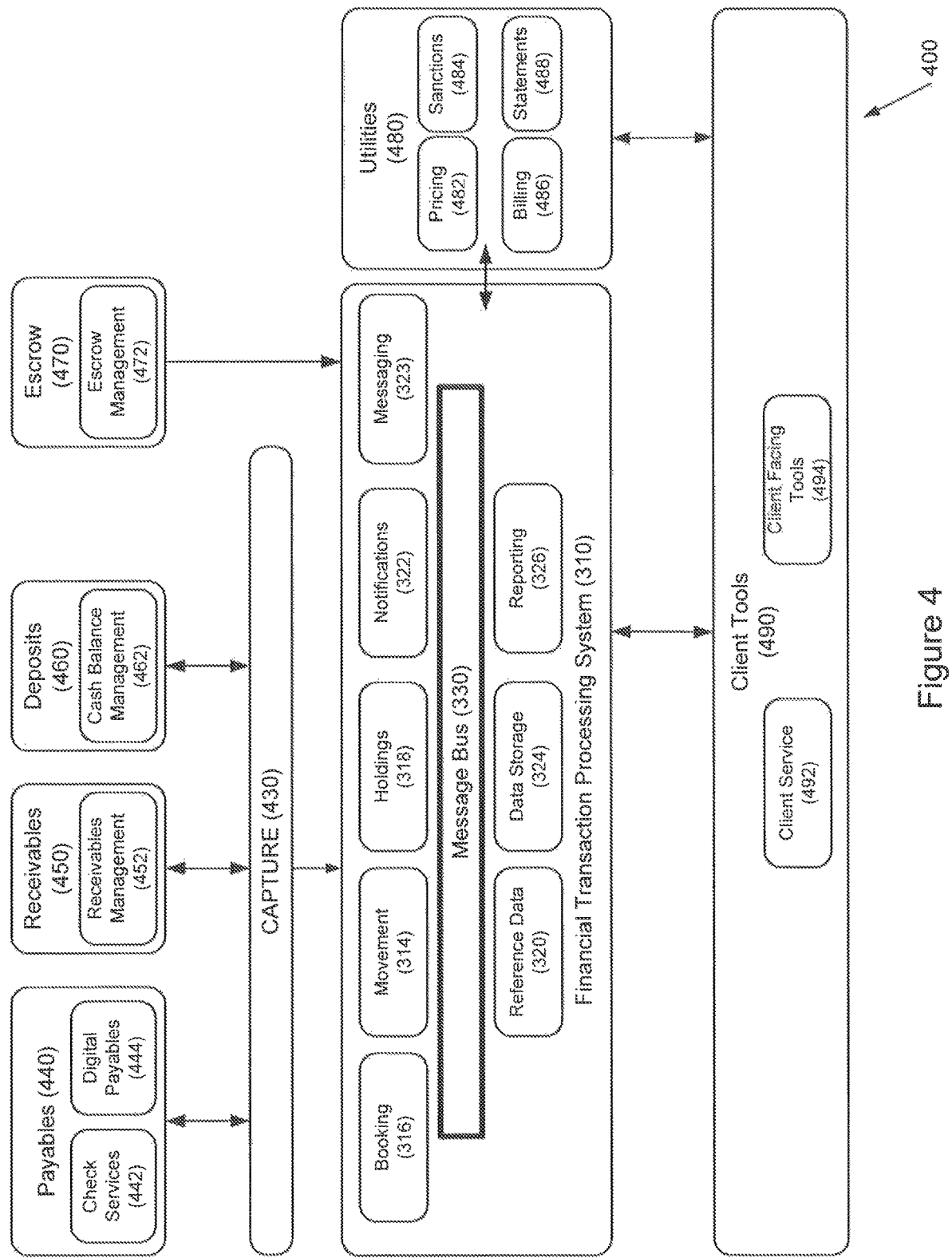
FIG. 4 depicts an exemplary asset record system, according to an embodiment of the present invention.

FIG. 4 depicts an exemplary asset record system, according to an embodiment of the present invention. As shown in FIG. 4, an exemplary cash management system may include a transaction processing system. System 400 may include capture module 430, that may capture raw data from, for example, systems such as payables 440 (including check services 442, digital payables 444), receivables 450 (including receivables management 452), deposits 460 (including cash balance management 462), etc. Capture module 430 may capture raw data from these and other systems in any format, and may convert the raw data to a normalized format (e.g., a logical data model format, discussed below).

According to an embodiment of the present invention, raw data from escrow system 470, including escrow management 472, may be received by financial transaction processing system 310.

Financial transaction processing system 310 may include modules, such as booking module 316, movement module 314, holding module 318, notifications module 322, messaging module 323, reference data 320, data storage module 324, and reporting module 326. Other modules may be provided as is necessary and/or desired. Each module may register with message bus 330 for the transactions types that it may process.

Utilities 480 may interact with financial transaction processing system 310. Utilities 480 may include modules, for example, pricing 482, sanctions 484, billing 486, and statements 488. For example, utilities 480 may provide general service(s) that may be used by multiple functional engines (e.g., inputs) as parameters may be provided by any component. In this example, an output may include an answer or output data and may then be used for further processing.

Client tools 490 may include client services 492 and client facing tools 494. For example, client tools may provide a user interface for reporting, auditing, etc. For example, client tools 490 may enable clients to query pervious transactions, initiate transactions, etc.

Figure 5:
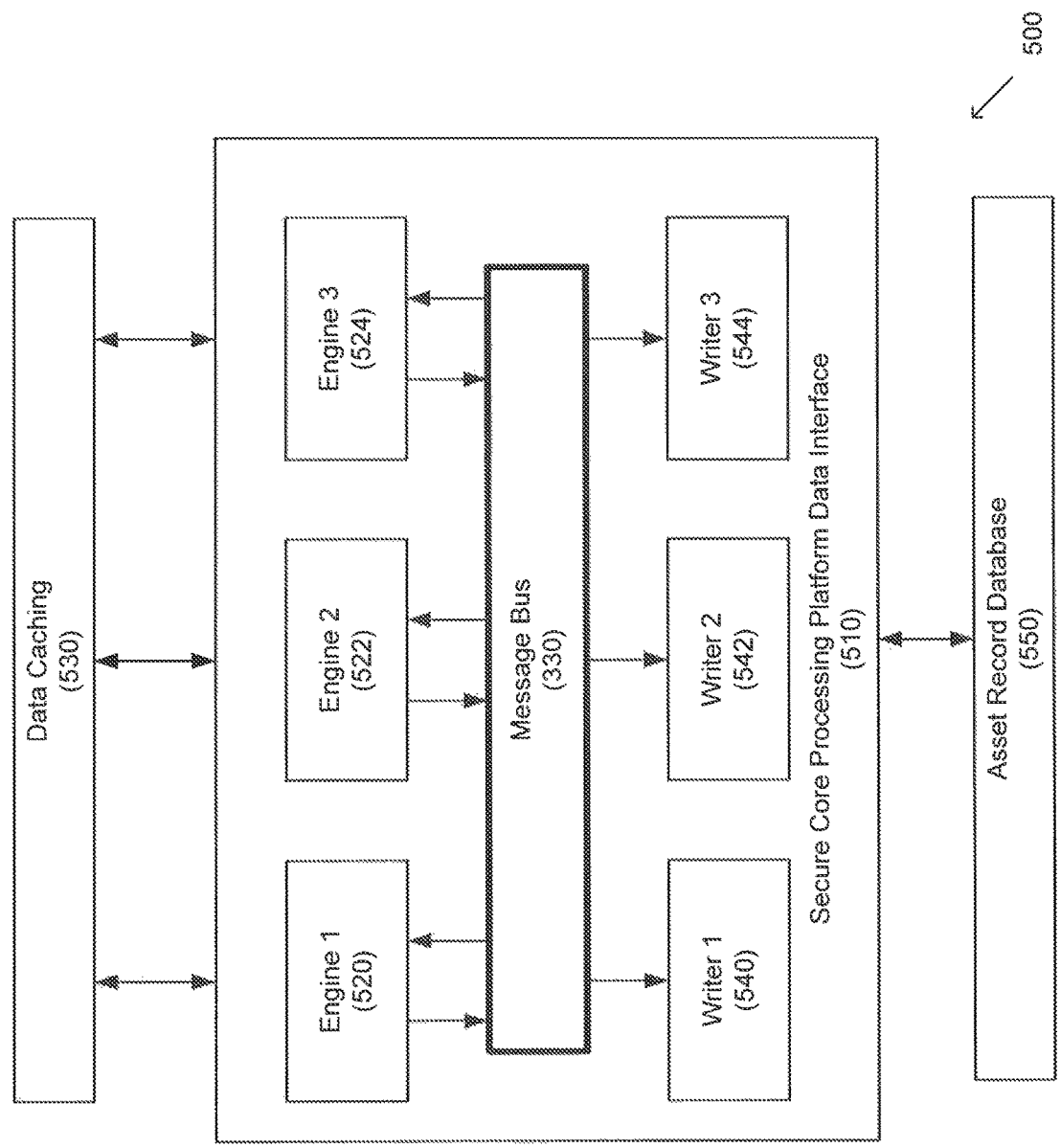
FIG. 5 depicts an architectural diagram of a financial transaction ecosystem, according to an embodiment of the present invention.

FIG. 5 depicts an architectural diagram of a financial transaction ecosystem, according to an embodiment of the present invention. FIG. 5 illustrates an exemplary asset record system. For example, system 500 may include data caching module 530, which may cache information (e.g., journal information, caching information, etc.).

According to an embodiment of the present invention, System 500 may further include a plurality of modules (e.g., module 520, module 522, and module 524, etc.) that may interact with message bus 330. Although three modules are depicted, a greater or fewer number may be provided as is necessary and/or desired.

According to an embodiment of the present invention, the modules may represent consumers of the message bus that may also create new LDM objects and publish them back to message bus.

Modules 520, 522, and 524 may include, for example, an asset movement module, a trade booking module, a journal module, aggregation module, ladders module, reinstatement module, etc. Other modules may be provided as is necessary and/or desired.

System 500 may also include a plurality of writers 540, 542, and 544. Although three writers are depicted, a greater or fewer number may be provided as is necessary and/or desired. Writers 440, 442, 444 may include, for example, a journal writer, a holding writer, etc.

According to an embodiment of the present invention, a user interface may be provided that permits view of objects on the message bus. Request/Response may allow consumers to make calls for holding (position) lookups that have already been published to the bus and stored in a database. For example, Request/Response may represent a convenience feature so that consumers who want the information may make ad hoc calls rather than listening to all published positions on the bus.

System 500 may further include asset record database 550 that may maintain a record of transactions, assets, etc. According to an embodiment of the present invention, asset record database 550 may service Request/Response calls as well as be used as a permanent store for purposes of loading real time caches for resiliency purposes. According to an embodiment of the present invention, real time caches may be repopulated based on asset record database following downtime or maintenance.

Figure 6:
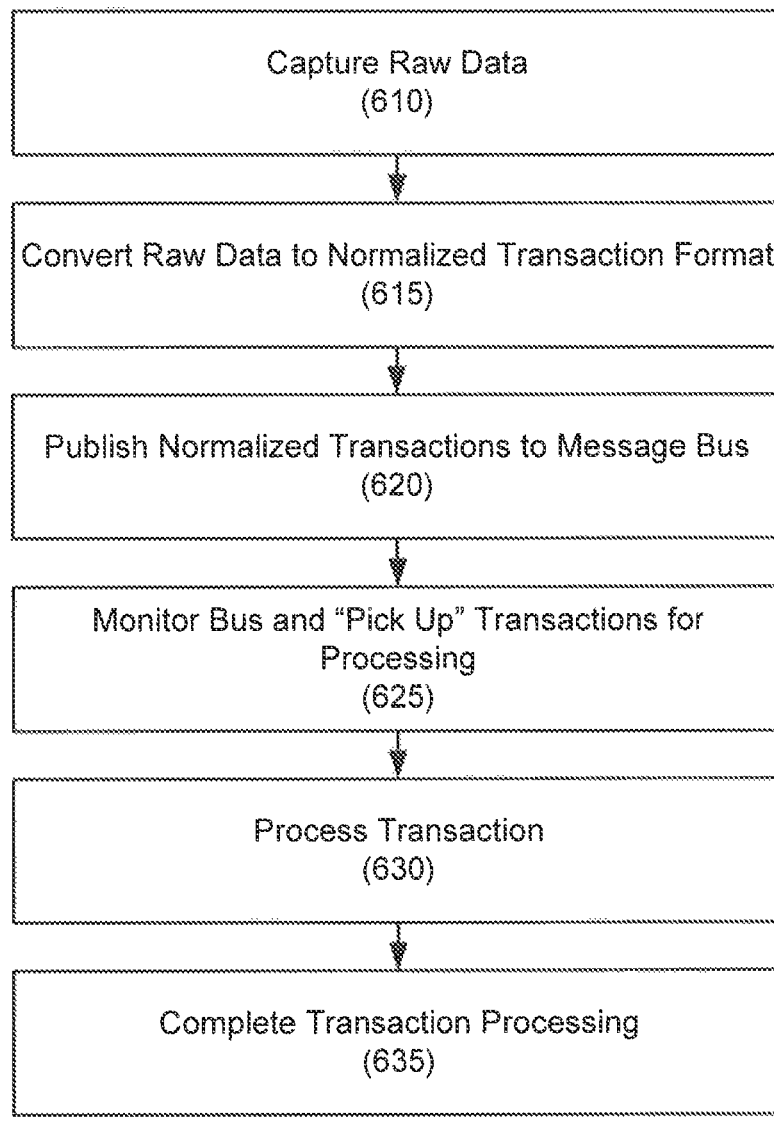
FIG. 6 depicts a method for transaction processing in a financial transaction processing ecosystem, according to an embodiment of the present invention.

FIG. 6 depicts a method for transaction processing in a financial transaction processing ecosystem, according to an embodiment of the present invention. At step 610, raw data may be captured. At step 615, the raw data may be normalized. At step 620, the normalized transaction may be published to a message bus. At step 625, modules and/or functions in the transaction processing ecosystem may monitor or listen to the message bus. At step 630, transactions may be processed. At step 635, transaction processing may be completed and/or forwarded to another system. While the process of FIG. 6 illustrates certain steps performed in a particular order, it should be understood that the embodiments of the present invention may be practiced by adding one or more steps to the processes, omitting steps within the processes and/or altering the order in which one or more steps are performed. Additional details for each step are provided below.

At step 610, raw data may be captured and brought into the processing ecosystem using, for example, a capture function. Examples of raw data may include individual or batches of transactions, files, etc. For example, the raw data may be received from user interfaces and/or systems. In addition, the raw data may be received in various formats.

At step 615, the raw data may be normalized. This may involve converting raw data to a normalized transformation format. According to an embodiment of the present invention, a configuration file (or a "config" file) may store a mapping of registered raw data formats to a standard format, such as a LDM (Logical Data Model) format.

For example, the raw data may be run through one or more processes to convert the raw data into standardized or normalized transactions that may be published to a message bus. According to an embodiment of the present invention, the transactions may be in an approved LDM (Logical Data Model) format. For example, each raw data format may be registered during a registration process, and the data fields in the raw data format may be mapped to an appropriate field in the LDM format.

According to an embodiment of the present invention, the configuration file may further identify modules that are involved in processing the transaction. For example, the LDM may be transformed into any suitable format, such as protobuf, JSON, XML, etc.

An illustrative example of a cash transaction in LDM format is provided below:

```
cashTransaction {
  transaction {
    transactionIdentifier {
      domain: IDENTIFIER_DOMAIN_NOT_SET
      value: "DeliveringComponentId"
      version: 1
      revision: 2
      domainType: DOMAIN_TYPE_NOT_SET
    }
    originatingSourceSystemIdentifier {
      domain: IDENTIFIER_DOMAIN_NOT_SET
      value: "originatingSystemId"
      version: 2
      domainType: DOMAIN_TYPE_NOT_SET
    }
    originatingSourceSystemEntryDatetime: 100000000000
    originatingSourceSystemInstanceIdentifier {
      domain: IDENTIFIER_DOMAIN_NOT_SET
      value: "originatingSystemInstanceId"
      version: 2
      domainType: DOMAIN_TYPE_NOT_SET
    }
    transactionNarrative {
      narrativeTypeName: INTERNAL
      narrativeText: "Transaction Notes as Narrative"
    }
    transactionStateName: NEW
    transactionEffectiveDate: 20180303
    transactionTypeName: CASH_TRANSACTION
    transactionBusinessEvent {
      eventIdentifier {
        domain: IDENTIFIER_DOMAIN_NOT_SET
        value: "evnt-id123"
        version: 1
        domainType: DOMAIN_TYPE_NOT_SET
      }
      eventTypeName: CASH_DIVIDEND
      eventTimestamp: 100000000000
    }
    deliveringSystemIdentifier {
      domain: IDENTIFIER_DOMAIN_NOT_SET
      value: "DeliveringSystemIdentifier"
      version: 1
      domainType: DOMAIN_TYPE_NOT_SET
    }
  }
  firmRootIdentifier {
    domain: IDENTIFIER_DOMAIN_NOT_SET
    value: "firmRootId"
    version: 1
    revision: 2
    domainType: DOMAIN_TYPE_NOT_SET
  }
  alternateTransactionIdentifier {
    domain: IDENTIFIER_DOMAIN_NOT_SET
    value: "alternateTxnId"
    version: 2
    domainType: DOMAIN_TYPE_NOT_SET
  }
  reportedBusinessDate: 20180303
  logicalBusinessDate: 20180303
  transactionTimestamp: 100000000000
  transactionPurposeTypeName: SEEDING_TRANSACTION
```

```
ownerPartyAccount {
  role: CLIENT
  accountIdentifier {
    domain: IDENTIFIER_DOMAIN_NOT_SET
    value: "owner acc 123"
    version: 1
    domainType: DOMAIN_TYPE_NOT_SET
  }
  legalEntity {
    partyIdentifier {
      domain: IDENTIFIER_DOMAIN_NOT_SET
      value: "PartyID123"
      version: 1
      domainType: DOMAIN_TYPE_NOT_SET
    }
    role: COUNTERPARTY
  }
}
counterpartyAccount {
  role: CLIENT
  accountIdentifier {
    domain: IDENTIFIER_DOMAIN_NOT_SET
    value: "owner acc 123"
    version: 1
    domainType: DOMAIN_TYPE_NOT_SET
  }
}
thirdPartyAccount {
  role: CLIENT
  accountIdentifier {
    domain: IDENTIFIER_DOMAIN_NOT_SET
    value: "owner acc 123"
    version: 1
    domainType: DOMAIN_TYPE_NOT_SET
  }
}
party {
  partyIdentifier {
    domain: IDENTIFIER_DOMAIN_NOT_SET
    value: "PartyID123"
    version: 1
    domainType: DOMAIN_TYPE_NOT_SET
  }
  role: COUNTERPARTY
}
originalCurrencyMoney {
  moneyRoleName: FIRST
  moneyAmount: 100.0
  currencyIdentifier {
    domain: IDENTIFIER_DOMAIN_NOT_SET
    value: "USD"
    version: 1
    domainType: DOMAIN_TYPE_NOT_SET
  }
  figurationTypeName: NOT_FIGURED
  valueBasedUponName: BROKER_FEE
  valueDeterminedByName: AMOUNT
  rate: 100.0
  percentage: 10.43
  originalToSettledCurrencyFxRate: 1.6
  multiplyDivideCode: MULTIPLY
}
originalCurrencyMoney {
  moneyRoleName: FINAL
  moneyAmount: 110.0
  currencyIdentifier {
    domain: IDENTIFIER_DOMAIN_NOT_SET
    value: "USD"
    version: 1
    domainType: DOMAIN_TYPE_NOT_SET
  }
  figurationTypeName: ADDED
  originalToSettledCurrencyFxRate: 1.6
  multiplyDivideCode: MULTIPLY
}
settledCurreneyMoney {
  moneyRoleName: FIRST
  moneyAmount: 160.0
  currencyIdentifier {
    domain: IDENTIFIER_DOMAIN_NOT_SET
    value: "USD"
    version: 1
    domainType: DOMAIN_TYPE_NOT_SET
  }
  figurationTypeName: NOT_FIGURED
}
settledCurrencyMoney {
  moneyRoleName: FINAL
  moneyAmount: 166.0
  currencyIdentifier {
    domain: IDENTIFIER_DOMAIN_NOT_SET
    value: "USD"
    version: 1
    domainType: DOMAIN_TYPE_NOT_SET
  }
  figurationTypeName: SUBTRACTED
}
currencyDirective {
  directivePurpose: SETTLEMENT
  directiveType: DELIVERY_METHOD
  value: PAY_CASH
}
currencyDirective {
  directivePurpose: SETTLEMENT
  directiveType: SUPPRESS_INSTRUCTION
  value: SUPPRESS_CASH_INSTRUCTION
}
directionTypeName: PAY
subTransaction {
  moneyRoleName: FIRST
  moneyAmount: 1000.0
  currencyIdentifier {
    domain: IDENTIFIER_DOMAIN_NOT_SET
    value: "USD"
    domainType: DOMAIN_TYPE_NOT_SET
  }
  subTransactionAccount {
    role: CLIENT
    accountIdentifier {
      domain: IDENTIFIER_DOMAIN_NOT_SET
      value: "acc-id1"
      version: 1
      domainType: DOMAIN_TYPE_NOT_SET
    }
  }
  subTransactionAccount {
    role: NOSTRO
    accountIdentifier {
      domain: IDENTIFIER_DOMAIN_NOT_SET
      value: "acc-id2"
      version: 1
      domainType: DOMAIN_TYPE_NOT_SET
    }
  }
}
paymentDate: 20180530
```

An illustrative example of a payment transaction in LDM format is provided below:

```
firmRootIdentifier {
  domain: RECEIVABLES_CAPTURE_ENGINE
  value: "FirmRootId-1"
  version: 1
  revision: 1
  domainType: DOMAIN_TYPE_NOT_SET
}
paymentCaptureIdentifier {
  domain: RECEIVABLES_CAPTURE_ENGINE
  value: "PaymentCaptureId-1"
  version: 1
  revision: 1
  domainType: DOMAIN_TYPE_NOT_SET
}
paymentState: OPEN
```

```
paymentRequestCreationDateTime: 1400000000000
requestedValueDate: 20180301
paymentMethodType: CHEQUE
alternateSourceIdentifier {
    domain: RECEIVABLES_CAPTURE_ENGINE
    value: "alternateSourceId-1"
    version: 1
    domainType: DOMAIN_TYPE_NOT_SET
}
alternateSourceIdentifier {
    domain: RECEIVABLES_CAPTURE_ENGINE
    value: "alternateSourceId-2"
    version: 1
    domainType: DOMAIN_TYPE_NOT_SET
}
businessEvent {
    businessEvent {
        eventIdentifier {
            domain: RECEIVABLES_CAPTURE_ENGINE
            value: "paymentBusinessEventId-1"
            domainType: DOMAIN_TYPE_NOT_SET
        }
        eventDateTime: 1400000000000
        relatedEventTypeName: ""
    }
    businessEventTypeName: PAYMENT_INITIATION
}
paymentReference {
    paymentReferenceType: CHEQUE_NUMBER
    paymentReferenceValue: "Test PaymentReferenceValue"
}
paymentDatePurpose {
    datePurposeName: ISSUE_DATE
    paymentDate: 20180302
}
remittanceAdvices {
    firmRootIdentifier {
        domain: RECEIVABLES_CAPTURE_ENGINE
        value: "FirmRootId-1"
        version: 1
        revision: 1
        domainType: DOMAIN_TYPE_NOT_SET
    }
    remittanceCaptureIdentifier {
        domain: RECEIVABLES_CAPTURE_ENGINE
        value: "remittanceCaptureId-1"
        version: 1
        revision: 1
        domainType: DOMAIN_TYPE_NOT_SET
    }
}
remittanceAdvices {
    firmRootIdentifier {
        domain: RECEIVABLES_CAPTURE_ENGINE
        value: "FirmRootId-1"
        version: 1
        revision: 1
        domainType: DOMAIN_TYPE_NOT_SET
    }
    remittanceCaptureIdentifier {
        domain: RECEIVABLES_CAPTURE_ENGINE
        value: "remittanceCaptureId-2"
        version: 2
        revision: 2
        domainType: DOMAIN_TYPE_NOT_SET
    }
}
paymentMatchedAmount {
    matchedAmount {
        value: "\006\217"
        scale: 2
    }
    currencyIdentifier {
        domain: RECEIVABLES_CAPTURE_ENGINE
        value: "USD"
        domainType: DOMAIN_TYPE_NOT_SET
    }
    moneyRole: FINAL
    balanceStatus: NOT_BALANCED
}
directives {
    directivePurpose: SETTLEMENT
    directiveText: SETTLE_IMMEDIATE_CASH_INSTRUCTION
    directiveTypeName: DELIVERY_METHOD
}
cashaspect {
    originalMonies {
        currencyIdentifier {
            domain: RECEIVABLES_CAPTURE_ENGINE
            value: "USD"
            domainType: DOMAIN_TYPE_NOT_SET
        }
        moneyAmount: 1048.75
        moneyRoleName: FINAL
    }
}
counterPartyAccount {
    role: CLIENT
    accountIdentifier {
        domain: RECEIVABLES_CAPTURE_ENGINE
        value: "counterPartyAccountId-1"
        version: 1
        domainType: DOMAIN_TYPE_NOT_SET
    }
    legalEntity {
        partyIdentifier {
            domain: RECEIVABLES_CAPTURE_ENGINE
            value: "counterPartyTransactionPartyId-1"
            version: 1
            domainType: DOMAIN_TYPE_NOT_SET
        }
        role: CLIENT
    }
    holdingTypes {
        transactionPurpose: BORROWED
        holdingLocationType: STANDARD
        tradePaymentType: FULLY_PAID
        blockedFromProcessingType: DELIVERY_BY_MARKET
        physicalInstrumentNegotiableForm: NON_NEGOTIABLE
    }
}
ownerpartyaccount {
    role: PAYER
    accountIdentifier {
        domain: RECEIVABLES_CAPTURE_ENGINE
        value: "ownerPartyAccountId-1"
        version: 1
        domainType: DOMAIN_TYPE_NOT_SET
    }
    legalEntity {
        partyIdentifier {
            domain: RECEIVABLES_CAPTURE_ENGINE
            value: "ownerPartyTransactionPartyId-1"
            version: 1
            domainType: DOMAIN_TYPE_NOT_SET
        }
        role: PAYER
    }
    holdingTypes {
        transactionPurpose: BORROWED
        holdingLocationType: STANDARD
        tradePaymentType: FULLY_PAID
        blockedFromProcessingType: DELIVERY_BY_MARKET
        physicalInstrumentNegotiableForm: NON_NEGOTIABLE
    }
}
thirdpartyaccounts {
    role: BENEFICIARY_CUSTOMER
    accountIdentifier {
        domain: RECEIVABLES_CAPTURE_ENGINE
        value: "thirdPartyAccountId-1"
        version: 1
        domainType: DOMAIN_TYPE_NOT_SET
    }
    legalEntity {
        partyIdentifier {
            domain: RECEIVABLES_CAPTURE_ENGINE
            value: "thirdPartyTransactionPartyId-1"
```

-continued

```
      version: 1
      domainType: DOMAIN_TYPE_NOT_SET
    }
    role: BRANCH
  }
  holdingTypes {
    transactionPurpose: BORROWED
    holdingLocationType: STANDARD
    tradePaymentType: FULLY_PAID
    blockedFromProcessingType: DELIVERY_BY_MARKET
    physicalInstrumentNegotiableForm: NON_NEGOTIABLE
  }
}
logicalBusinessDate: 20180302
preSettlementMatchIdentifier {
  preSettlementMatchIdentifier {
    domain: RECEIVABLES_CAPTURE_ENGINE
    value: "preSettlementMatchId-1"
    version: 1
    revision: 1
    domainType: DOMAIN_TYPE_NOT_SET
  }
}
paymentMatchStatus: NOT_KNOWN
alternatePaymentCaptureIdentifier {
  domain: RECEIVABLES_CAPTURE_ENGINE
  value: "alternatePaymentCaptureId-1"
  version: 1
  domainType: DOMAIN_TYPE_NOT_SET
}
alternatePaymentCaptureIdentifier {
  domain: RECEIVABLES_CAPTURE_ENGINE
  value: "alternatePaymentCaptureId-2"
  version: 1
  domainType: DOMAIN_TYPE_NOT_SET
}
```

At step 620, the normalized transaction may be published to a message bus.

At step 625, modules and/or functions in the transaction processing ecosystem may monitor and/or listen to the message bus, and, at step 630, may process relevant normalized transactions. For example, at start up or at any other appropriate time, each module may register with the message bus (or a message bus controller) with the types of transactions that the module is responsible for processing, order of processing, etc. When such a transaction is published to the message bus, one or more modules may "pick up" the transaction from the message bus and perform processing on the transaction. When the module picks up the transaction, it may publish an acknowledgement message to the message bus informing other modules of the state of the transaction.

According to an embodiment of the present invention, rather than the module picking up the transaction from the message bus, the message bus may push a transaction to a module based on the registration information for the module.

For example, financial transactions may be identified and "picked up" by a booking module, which may then prepare the transaction for processing. There may be multiple types of booking modules depending on the transaction. Examples include cash, securities, billing, invoice, expected cash receipt, billing invoice transaction, remittance, etc. According to an embodiment of the present invention, the booking module may create multiple "legs" for a single transaction for different legal entities. The module may then publish one more bookable transactions to the message bus.

An asset movement module and an asset record module may listen for bookable transactions that are published to the message bus. The asset movement module may pick up the bookable transaction(s) and create a settlement transaction having an initial state of "open." This function may further deliver the settlement transaction to the appropriate settlement module (e.g., CHiP, FED, SWIFT, etc.). As transactions are settled, an asset movement module may update the state of the settlement transaction to closed, complete, etc.

According to an embodiment of the present invention, a standard reference data cache that identifies the different functions on the bus may call out to/for reference data. According to an exemplary illustration, only identifiers may be stored on the transactions that flow through the ecosystem and the reference data cache may be called if those identifiers need to be resolved to obtain the actual or underlying data.

Reference Data may include data relating to Client, Accounts and Counterparty/Third Party (Cpty), Standing Settlement Instructions (SSI), Products, Client preferences and profiles, Clearing data, Market Data, Client Direct Debit (DD) Mandate. Reference data may be stored and managed via a Reference Data Cache Tool. Reference data may further include parties and accounts, products and instruments, escrow deal management (e.g., reference data to manage escrow deals), pricing deal management (e.g., reference data to manage pricing deals for various products and clients), settlement instructions (e.g., client standing instructions), sanctions, billing, statements composition, etc.

According to an embodiment of the present invention, an asset record module may also listen for bookable transactions along with any settlements that have been published to the message bus. The asset record module may include a rules engine that may apply rules against the different bookable transactions to create a journal or record (including, for example, deposit/credit sets), which may also be published to the message bus. The journals may be aggregated into sets and/or other format.

According to an embodiment of the present invention, transactions, including state changes, may be stored in, for example, a data warehouse for reporting and auditing.

At step 635, the module may return the processed transaction to the message bus. If the module is the end point for the transaction, the processed transaction may be sent to another system, to a user interface, or may take any other action as is necessary and/or desired.

Figure 7A:
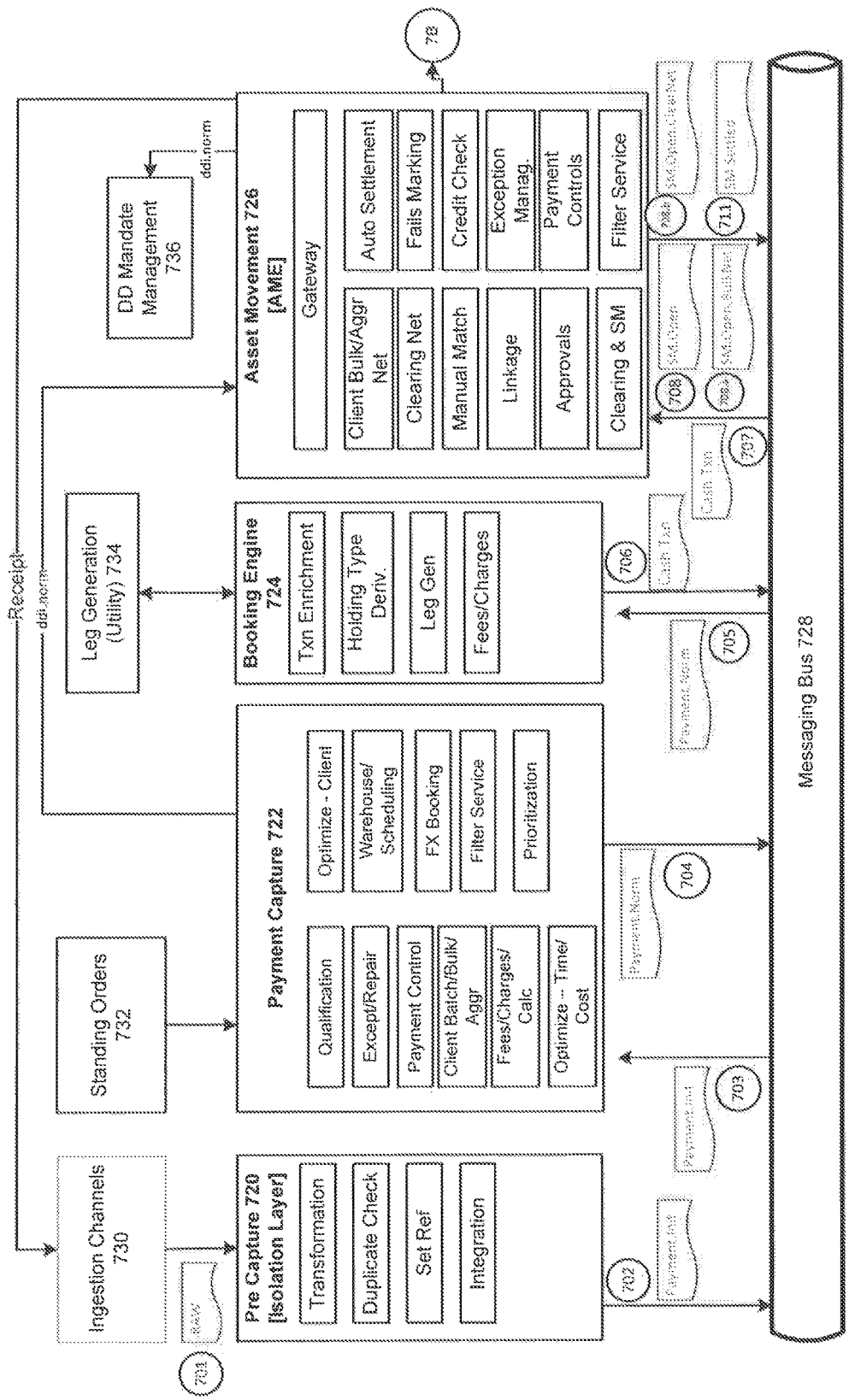
FIGS. 7A and 7B depict an illustrative example of a payment receipt/pay cash flow, according to an embodiment of the present invention.
Figure 7B:
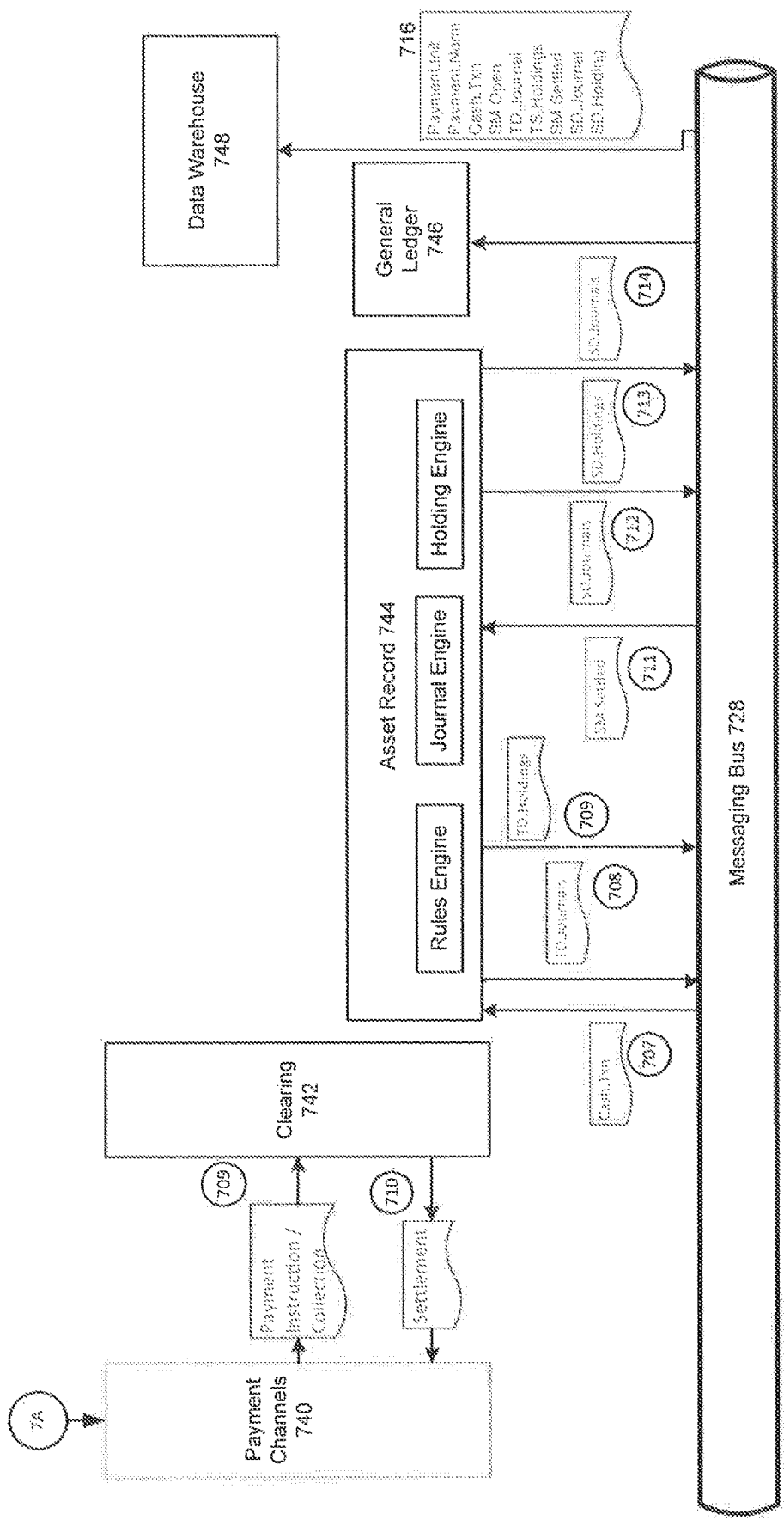

FIGS. 7A and 7B depict an illustrative example of a payment receipt/pay cash flow, according to an embodiment of the present invention. During pre-capture, "payment.raw" 701 is transformed to "payment.initiation" 702, which may be subsequently enriched/validated through payment capture 722. "Payment.norm" 704 is produced from payment capture 722, which results in a "cashtxn.bookable" 706 from payment booking engine 724. "Cashtxn.bookable" 707 is processed through the asset movement engine 726 (open settlements) and asset record 744 (pending journals are created). The payment is confirmed/settled via asset movement engine 726 which results in "settlement movements" 711 being settled and asset record 744 consuming these to pending "positions/journals to settled/confirmed" as represented by 708, 709, 712 and 713.

As shown in FIG. 7A, a new payment or receipt may be initiated by a client or clearing system, as represented by 701. Ingestion Channels 730 may represent a payment initiation source, e.g., client, clearing systems, etc. The data may be received as raw data 701 at Pre-Capture 720, which may represent an Isolation Layer. Pre-Capture 720 may perform functions, including Transformation, Duplicate Check, Setting of References (Set Ref), and Integration. Payment may be initiated at 702 from Pre Capture 720 to Messaging Bus 728. Payment capture 722 may receive payment initiation at 703. Through Payment Capture 722, payment initiation may be normalized as Payment.Norm at 704.

Payment capture 722 may include various features and functions including Qualification, Except/Repair, Payment Control, Client Batch/Bulk/Aggregation, Fees/Charges/Calculations; Optimize—based on Time and/or Cost; Optimize—Client; Warehouse/Scheduling, FX Booking, Filter Service and Prioritization. Payment capture 722 may receive data from Standing Orders 732. For example, Payment capture 722 may capture client instructions across various transaction types and further transform into normalized data model. Payment capture 722 may perform transformation from client specific data model into a universal (or entity specific) data model. The normalized transactional data model message may be published to Messaging Bus 728. Capture processing may include OCR/ICR, machine learning, file processing and message processing.

Payment.Norm may be received by Booking Engine 724 at 705 to generate a client booking as Cash.Txn.Bookable at 706. Booking Engine 724 may include various features and functions including Transaction Enrichment, Holding Type Derivative, Leg Generation, and Fees/Charges. Leg Generation may represent transactional leg generation, e.g., additional transactions that may be required. Booking Engine 724 may communicate with Leg Generation 734. An embodiment of the present invention may include a plurality of booking engines, e.g., one booking engine for each transaction type. For example, booking engines may share underlying technical components but run as separate instances for different transactional types.

This may be received by Asset Movement 726 to update Settlement Mission status to Matched at 707. Settlement mission may be generated from a settlement file, as shown by SM.Open 708, SM.Open.BulkNet 708.*a*, SM.Open.ClearNet 708.*b* and SM.Settled 711. For example, Settlement Mission status may be OPEN.Matched. Upon settlement, status may be set to SETTLED, via 711.

Asset Movement 726 may include various features and functions including Gateway, Client Bulk Aggregation/Netting, Clearing Netting/Aggregation, Manual Match, Linkage, Approvals, Clearing and Settlement (SM), Auto Settlement, Fails Marking, Credit Check, Exception Management, Payment Controls, and Filter Service. Asset Movement 726 may receive data (e.g., ddi.norm) from Payment Capture 722 and further send data (e.g., ddi.norm) to Direct Debit (DD) Management 736, e.g., setting up and/or managing client direct debit instructions. Asset Movement 726 may create settlement missions for various types of transactions that require asset movements. In addition, Asset Movement 726 may provide a receipt or confirmation message to Ingestion Channels 730.

As shown in FIG. 7B, payment instruction/collection 709 may be sent from Payment Channels 740 to Clearing System 742. After the payment has been settled, Settlement 710 may be returned to Payment Channels 740. Journal (posting) may be created for both client and settlement. Journal/Holding status may be represented as Pending-Post.

Asset Record 744 may create journals and holdings from input events. For example, Asset Record 744 may include Rules Engine, Journal Engine and Holding Engine. Rules Engine may hold rules for transformation of events into journals. Journal Engine may create journals (DR/CR sets) from events. For example, Holding Engine may aggregate DR/CR sets that have been produced and create holdings (e.g., positions, balances). Other engines may include an Aggregation Engine that aggregates journal sets and applies impacts to Holdings and a Publish Engine may publish Journals and Holdings as changes occur to each. Also, Asset Record 744 may post account journal for both client and settlement. Through the interactions of 707, 708, 709, 711, 712 and 713, Journal/Holding status may be represented as Settled-Post. Data may be posted to a General Ledger 746 as well as a Data Warehouse 748. Data may include Payment.Init; Payment.Norm; Cash.Txn; SM.Open; TD.Journal; TS.Holdings. SM.Settled, SD.Journal and SD.Holding as represented by 716.

An embodiment of the present invention may be applied to various applications, businesses, etc. For example, the event based infrastructure may be applied to core banking technologies, merchant services businesses, international fixed income businesses, etc. In addition, various extensions may be applied. For example, the financial transaction processing system may support exception management and reconciliation features. For example, exceptions may apply to trade booking engines, settlement systems as well as other systems of record. If an exception is closed in one system of record, an embodiment of the present invention may cascade or route the update through the messaging bus and thereby remove any duplicative effort relating to the exception. The exception may be read by a reconciliation system of record or task management system of record, as appropriate. This results in improved consistency and uniformity of data and response.

An embodiment of the present invention may support a position rollup and/or position aggregate. For example, a business may request information on an available balance, which may be an aggregate of underlying balances and positions. This may be relevant to virtual accounts where a member may have an account and reside in a certain region. The funding for the region may be at an aggregate level where the aggregate needs funding. Accordingly, an embodiment of the present invention may support position checks at the aggregate level before transactions can be allowed to hit the underlying balance. Another example may involve an entity having to pay developers in a region or currency. Other aggregates may depend on specific use case scenarios. For example, for a loan, a business may want to calculate available positions or available balances that would exclude an amount of the loan. Accordingly, an embodiment of the present invention may be configurable based on the business rules to determine aggregate level positions.

Hereinafter, general aspects of implementation of the systems and methods of the invention will be described.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ operating system, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A transaction processing ecosystem comprising:
a plurality of data sources;
a capture interface; and
a financial transaction processing system comprising a message bus and a plurality of processors interfacing with the message bus and configured to perform:
registering, with the message bus, registration information of each of the plurality of processors, the registration information indicating a transaction processing capability of a respective processor, and the plurality of processors having different transaction processing capabilities such that each of the plurality of processors is capable of processing a different transaction type;
receiving, via the capture interface, raw data in a raw data format for a payment transaction, wherein the raw data comprises client instructions;
registering the raw data format with the message bus, the registration comprising mapping each of a plurality of data fields in the raw data format to a corresponding data field in a standardized logical data model format;
normalizing, via the capture interface, the raw data into standardized transaction data for the standard logical data model format based on the raw data format registration, to provide a normalized transaction format;
publishing, via the capture interface, the normalized transaction format as a transaction to the message bus that interfaces with the plurality of processors such that each of the plurality of processors is notified of the publishing;
monitoring, by the plurality of processors, the message bus for the transaction to process based on the registration information of each of the plurality of processors, the transaction including a first sub-transaction of a first transaction type and a second sub-transaction of a second transaction type that is different from the first transaction type;
pulling, by a first processor among the plurality of processors and from the message bus, the transaction including the first sub-transaction of the first transaction type for processing based on a transaction processing capability of the first processor according to the registration information of each of the plurality of processors, wherein the first transaction type corresponds to a transaction type capable of being processed by the first processor among the plurality of processors, but not by other processors among the plurality of processors;
notifying the other processors among the plurality of processors of the transaction pulled for processing based on the transaction processing capability of the first processor;
processing, via the first processor of the plurality of processors, the first sub-transaction of the transaction;
returning the transaction processed by the first processor to the message bus and publishing the transaction including the second sub-transaction that has not yet been processed to the message bus for further processing by another processor among the plurality of processors;
monitoring, by the plurality of processors and based on the registration information of each of the plurality of processors, the message bus for the transaction that was processed by the first processor and requires further processing of the second sub-transaction;

pulling, from the message bus and by a second processor among the plurality of processors, the transaction including the second sub-transaction for processing, when the second transaction type of the second sub-transaction corresponds to a transaction type capable of being processed by the second processor among the plurality of processors, but not by the other processors among the plurality of processors;

determining whether the second processor is an end point for the payment transaction, such that no further processing is required by remaining of the plurality of processors; and in response to a determination that the second processor is the end point for the payment transaction, sending the processed standardized transaction to a user interface and completing the payment transaction.

2. The transaction processing ecosystem of claim 1, wherein the raw data is normalized to a logical data model format.

3. The transaction processing ecosystem of claim 1, wherein the registration information of the first processor comprises an identification of a transaction type that the first processor will process.

4. The transaction processing ecosystem of claim 1, wherein the first processor further publishes an acknowledgement to the message bus.

5. The transaction processing ecosystem of claim 1, wherein the first processor publishes the transaction processed with the first processor to the message bus.

6. The transaction processing ecosystem of claim 1, wherein the first processor further performs settlement actions on the normalized transaction format.

7. The transaction processing ecosystem of claim 1, wherein the financial transaction processing system communicates the processed transaction to an external system.

8. The transaction processing ecosystem of claim 1, wherein the financial transaction processing system communicates the processed transaction to a user interface.

9. The transaction processing ecosystem of claim 1, wherein the processing of the first sub-transaction of the transaction by the first processor, triggers the first processor to publish, to the message bus, the second sub-transaction of the transaction for processing by the other processors among the plurality of processors.

10. A method for processing transactions in a transaction processing ecosystem comprising a financial transaction processing system comprising a message bus and a plurality of processors interfacing with the message bus, the method comprising the steps of:

registering, with the message bus, registration information of each of the plurality of processors, the registration information indicating a transaction processing capability of a respective processor, and the plurality of processors having different transaction processing capabilities such that each of the plurality of processors is capable of processing a different transaction type;

receiving, via a capture interface, raw data in a raw data format for a payment transaction, wherein the raw data comprises client instructions;

registering, via the capture interface, the raw data format with the message bus, the registration comprising mapping each of a plurality of data fields in the raw data format to a corresponding data field in a standardized logical data model format;

normalizing, via the capture interface, the raw data into standardized transaction data for the standard logical data model format based on the raw data format registration, to provide a normalized transaction format;

publishing, via the capture interface, the normalized transaction format as a transaction to the message bus that interfaces with the plurality of processors such that each of the plurality of processors is notified of the publishing;

monitoring, by the plurality of processors, the message bus for the transaction to process based on the registration information of each of the plurality of processors, the transaction including a first sub-transaction of a first transaction type and a second sub-transaction of a second transaction type that is different from the first transaction type;

pulling, by a first processor among the plurality of processors and from the message bus, the transaction including the first sub-transaction of the first transaction type for processing based on a transaction processing capability of the first processor according to the registration information of each of the plurality of processors, wherein the first transaction type corresponds to a transaction type capable of being processed by the first processor among the plurality of processors, but not by other processors among the plurality of processors;

notifying the other processors among the plurality of processors of the transaction pulled for processing based on the transaction processing capability of the first processor;

processing, via the first processor of the plurality of processors, the first sub-transaction of the transaction;

returning the transaction processed by the first processor to the message bus and publishing the transaction including the second sub-transaction that has not yet been processed to the message bus for further processing by another processor among the plurality of processors;

monitoring, by the plurality of processors and based on the registration information of each of the plurality of processors, the message bus for the transaction that was processed by the first processor and requires further processing of the second sub-transaction;

pulling, from the message bus and by a second processor among the plurality of processors, the transaction including the second sub-transaction for processing, when the second transaction type of the second sub-transaction corresponds to a transaction type capable of being processed by the second processor among the plurality of processors, but not by the other processors among the plurality of processors;

determining whether the second processor is an end point for the payment transaction, such that no further processing is required by remaining of the plurality of processors; and in response to a determination that the second processor is the end point for the payment transaction, sending the processed standardized transaction to a user interface and completing the payment transaction.

11. The method of claim 10, wherein the raw data is normalized to a logical data model format.

12. The method of claim 10, wherein the registration information of the first processor comprises an identification of a transaction type that the first processor will process.

13. The method of claim 10, wherein the first processor further publishes an acknowledgement to the message bus.

14. The method of claim 10, further comprising: publishing, via the first processor, the transaction processed with the first processor to the message bus.

15. The method of claim 10, wherein the first processor further performs settlement actions on the normalized transaction format.

16. The method of claim 10, wherein the financial transaction processing system communicates the processed transaction to an external system.

17. The method of claim 10, wherein the financial transaction processing system communicates the processed transaction to a user interface.

\* \* \* \* \*